US011124038B2

(12) United States Patent
Eggebrecht

(10) Patent No.: US 11,124,038 B2
(45) Date of Patent: Sep. 21, 2021

(54) COMPRESSED-AIR SUPPLY INSTALLATION, PNEUMATIC SYSTEM, AND METHOD FOR OPERATING A COMPRESSED-AIR SUPPLY INSTALLATION OR A PNEUMATIC SYSTEM

(71) Applicant: WABCO Europe BVBA, Brussels (BE)

(72) Inventor: Detlev Eggebrecht, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 207 days.

(21) Appl. No.: 16/480,710

(22) PCT Filed: Jan. 24, 2018

(86) PCT No.: PCT/EP2018/051622
§ 371 (c)(1),
(2) Date: Jul. 25, 2019

(87) PCT Pub. No.: WO2018/153597
PCT Pub. Date: Aug. 30, 2018

(65) Prior Publication Data
US 2021/0129616 A1 May 6, 2021

(30) Foreign Application Priority Data
Feb. 22, 2017 (DE) .......................... 102017001710.7

(51) Int. Cl.
*B60G 17/052* (2006.01)
*B60T 17/00* (2006.01)
*B60T 13/68* (2006.01)

(52) U.S. Cl.
CPC ........ *B60G 17/0523* (2013.01); *B60T 17/004* (2013.01); *B60G 2202/152* (2013.01);
(Continued)

(58) Field of Classification Search
CPC .. B60G 17/052; B60G 17/0523; B60G 17/04; B60G 2500/201; B60G 2500/203–205;
(Continued)

(56) References Cited

U.S. PATENT DOCUMENTS 10,343,479 B2  7/2019  Bodet et al.
2013/0192681 A1*  8/2013  Meier ................. F17D 1/02
137/2
(Continued)

FOREIGN PATENT DOCUMENTS

DE    102011109500 A1   6/2012
DE    102012001736 A9   8/2014
(Continued)

*Primary Examiner* — James A English
(74) *Attorney, Agent, or Firm* — Leydig, Voit & Mayer, Ltd.

(57) ABSTRACT

A compressed-air supply installation for operating a pneumatic installation includes a compressed-air feed, a compressed-air connection to the pneumatic installation, and a ventilation connection to a surrounding environment. The compressed-air supply installation further includes a pneumatic main line between the compressed-air feed and the compressed-air connection, the pneumatic main line having an air dryer, a ventilation line between the compressed-air feed and the ventilation connection, and a valve arrangement having a control valve configured to control a ventilation valve. The control valve is connected by a control valve connection in a pneumatic control line that is connected to a pressure control connection of the ventilation valve, the ventilation valve is connected by a ventilation valve connection in the ventilation line, and the control valve is assigned a control valve ventilation connection that is configured to be switchably connected to the ventilation connection or to the surrounding environment.

19 Claims, 4 Drawing Sheets

(52) U.S. Cl.
    CPC ...... *B60G 2300/07* (2013.01); *B60G 2500/02* (2013.01); *B60G 2500/2012* (2013.01); *B60G 2500/2044* (2013.01); *B60T 13/683* (2013.01)

(58) Field of Classification Search
    CPC ........ B60G 2500/02; B60G 2500/2044; F15B 21/044; F15B 21/048; F15B 2211/205005; F15B 2211/50336; F15B 2211/528; F04B 49/06; F04B 49/22
    See application file for complete search history.

(56) References Cited

U.S. PATENT DOCUMENTS

| | | |
|---|---|---|
| 2013/0195682 A1 | 8/2013 | Becher et al. |
| 2013/0255240 A1* | 10/2013 | Bergemann ........... F15B 21/048 60/327 |
| 2013/0276899 A1 | 10/2013 | Frank et al. |
| 2013/0318954 A1* | 12/2013 | Frank ................. B60G 17/0155 60/407 |
| 2014/0373718 A1* | 12/2014 | Bergemann ........... F15B 21/048 96/118 |
| 2018/0287531 A1* | 10/2018 | Abdelfattah .............. H02P 7/29 |
| 2019/0030976 A1* | 1/2019 | Bodet .................... F04B 49/22 |

FOREIGN PATENT DOCUMENTS

| | | |
|---|---|---|
| DE | 102012001734 A9 | 9/2014 |
| WO | WO 2016026577 A1 | 2/2016 |

\* cited by examiner

COMPRESSED-AIR SUPPLY INSTALLATION, PNEUMATIC SYSTEM, AND METHOD FOR OPERATING A COMPRESSED-AIR SUPPLY INSTALLATION OR A PNEUMATIC SYSTEM

CROSS REFERENCE TO RELATED APPLICATIONS

This application is a U.S. National Stage Application under 35 U.S.C. § 371 of International Application No. PCT/EP2018/051622 filed on Jan. 24, 2018, and claims benefit to German Patent Application No. DE 10 2017 001 710.7 filed on Feb. 22, 2017. The International Application was published in German on Aug. 30, 2018, as WO 2018/153597 A1 under PCT Article 21(2).

FIELD

The invention relates to a compressed-air supply installation, to a pneumatic system having a compressed-air supply installation, and to a method for controlling a compressed-air supply installation, in particular for operating a pneumatic installation.

BACKGROUND

A compressed-air supply installation is used in vehicles of all types, in particular for supplying compressed air to an air suspension installation of a vehicle. Air suspension installations may also comprise ride-height control devices by means of which the distance between a vehicle axle and vehicle body can be adjusted. An air suspension installation of a pneumatic system mentioned in the introduction comprises a number of air bellows which are pneumatically connected to a common line (gallery) and which, with increasing filling, can raise the vehicle body and, correspondingly, with decreasing filling, can lower the vehicle body. With increasing distance between the vehicle axle and vehicle body or increasing ground clearance, the spring travels become longer, and even greater ground unevennesses can be overcome without contact occurring with the vehicle body. Such systems are used in off-road vehicles and Sport Utility Vehicles (SUV). In particular in the case of SUVs, it is desirable in the case of very high-performance engines for the vehicle to be equipped firstly with a relatively low ground clearance for high speeds on the road and secondly with a relatively high ground clearance for off-road terrain. It is furthermore desirable for a change in the ground clearance to be implemented as quickly as possible, which increases the demand with regard to speed, flexibility and reliability of a compressed-air supply installation.

A compressed-air supply installation for use in a pneumatic system with a pneumatic installation, for example an above-described air suspension installation, is operated with compressed air from a compressed-air feed, for example in the range of a pressure level of 5 to 20 bar. The compressed air is provided to the compressed-air feed by means of an air compressor, with for example one compressor or possibly a two-stage compressor. The compressed-air feed is, for the supply to the pneumatic installation, pneumatically connected to a compressed-air connection and, secondly, is pneumatically connected to a ventilation connection. Via a ventilation valve, by discharging of air in one or more ventilation connections, the compressed-air supply installation can be ventilated to the surroundings.

To ensure long-term operation of the compressed-air supply installation and/or of the pneumatic installation, this has an air dryer, by means of which the compressed air to be supplied to the system is to be dried. In this way, the accumulation of moisture in the pneumatic system is avoided, which could otherwise, in the presence of relatively low temperatures, lead to valve-damaging crystal formation, and furthermore to undesired defects in the compressed-air supply installation and in the pneumatic installation. An air dryer has a drying agent, commonly a granulate fill, through which the compressed air can flow, such that the granulate fill can—in the presence of relatively high pressure—take in, by adsorption, the moisture contained in the compressed air. An air dryer may possibly be designed as a regenerative air dryer. This may be realized by virtue of the granulate fill being flowed through during every ventilation cycle—in the presence of relatively low pressure—with the dried compressed air from the air suspension system in an opposing-flow or concurrent-flow configuration relative to the filling direction. For this purpose, the ventilation valve may be opened. For such a use—also referred to as pressure alternation adsorption—it has proven to be desirable to design a compressed-air supply installation to be flexible and simultaneously reliable, in particular in order to permit a relatively fast ventilation with a pressure alternation which is nevertheless sufficient for a regeneration of the air dryer.

In the case of some vehicles, owing to the type of construction, it is necessary during the ventilation of the air bellows to maintain a residual pressure, which may indeed lie in the range of 1 to 3 bar. In the case of other vehicles, in particular vehicles with a so-called lift axis, it is necessary, owing to the type of construction, for the air bellows to be evacuated completely to 0 bar. The stated pressures are to be understood as relative pressures (relative to atmospheric pressure).

Compressed-air supply installations for the operation of an air suspension installation of a vehicle are known for example from DE 10 2012 001 734 A9 and DE 10 2012 001 736 A9.

SUMMARY

In an embodiment, the present invention provides a compressed-air supply installation for operating a pneumatic installation. The compressed-air supply installation includes a compressed-air feed, a compressed-air connection to the pneumatic installation, and a ventilation connection to a surrounding environment. The compressed-air supply installation further includes a pneumatic main line between the compressed-air feed and the compressed-air connection, the pneumatic main line having an air dryer, a ventilation line between the compressed-air feed and the ventilation connection, and a valve arrangement having a control valve configured to control a ventilation valve. The control valve is connected by a control valve connection in a pneumatic control line that is connected to a pressure control connection of the ventilation valve, the ventilation valve is connected by a ventilation valve connection in the ventilation line, and the control valve is assigned a control valve ventilation connection that is configured to be switchably connected, by the ventilation valve, to the ventilation connection or to a connection to the surrounding environment and which is configured to be switchably separated, by the ventilation valve, from the ventilation connection or from the surroundings connection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
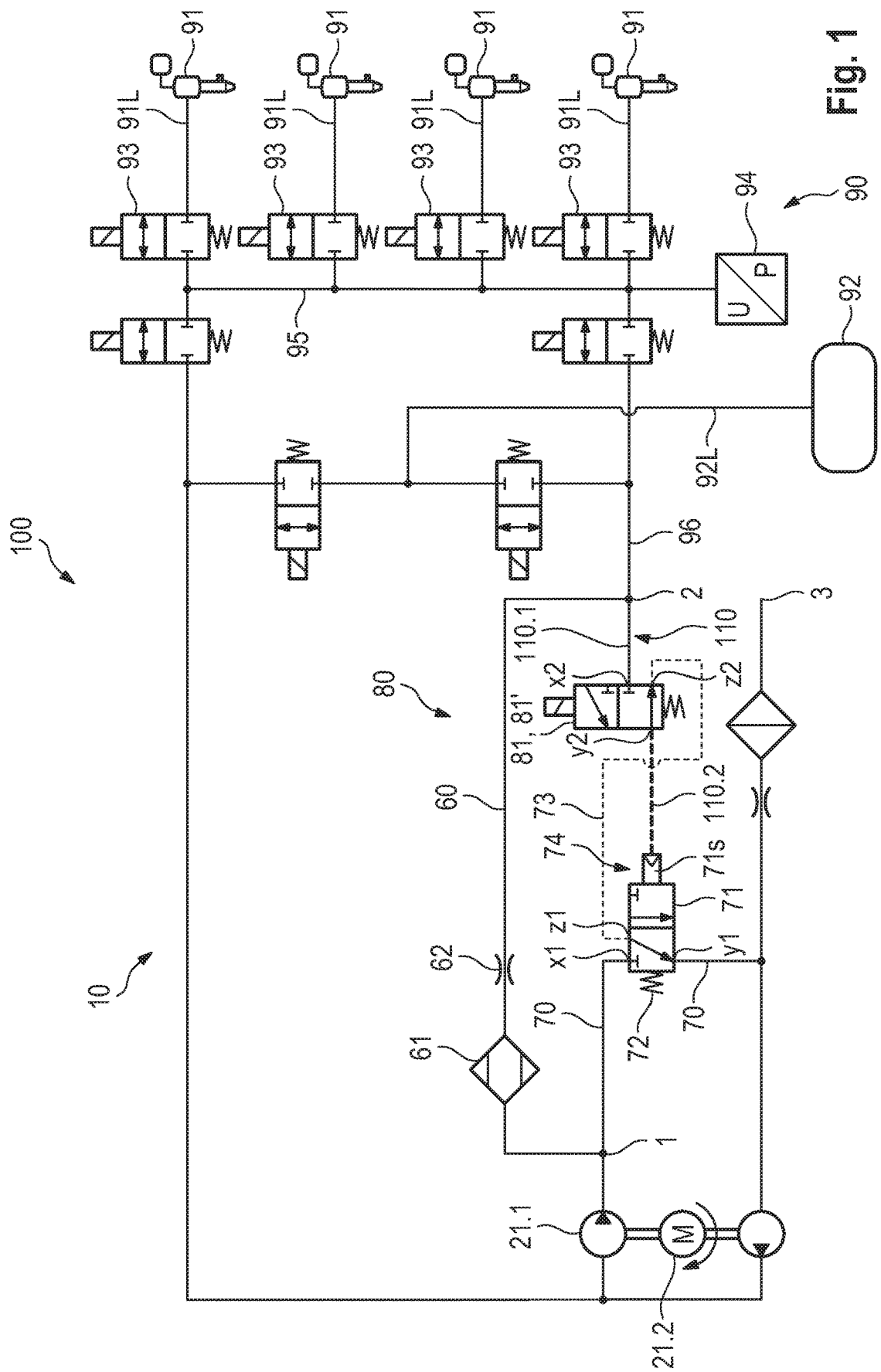
FIG. 1 shows an embodiment of a pneumatic system having a compressed-air supply installation and having a pneumatic installation, wherein a valve arrangement having a control valve for controlling a ventilation valve is provided.

Embodiments of the invention provide a device, in particular a compressed-air supply installation and a pneumatic system having a compressed-air supply installation, which—building on a valve arrangement with a control valve and a ventilation valve—provides improved functionality, in particular improved ventilation functionality. Embodiments of the invention additionally provide a suitable method for operating, in particular controlling, the compressed-air supply installation and/or the pneumatic installation.

According to an embodiment of the invention, a compressed-air supply installation is provided in which the control valve is assigned a control valve ventilation connection which is switchably connectable, by means of the ventilation valve, to the ventilation connection or to a surroundings connection and which is switchably separable, by means of the ventilation valve, from the ventilation connection or from the surroundings connection. The control valve preferably has the control valve ventilation connection.

In other words, the control valve ventilation connection is not permanently connected to the ventilation connection or to the surroundings connection. Rather, a pneumatic connection between control ventilation connection and ventilation connection or surroundings connection is switchable by means of the ventilation valve, or is dependent on a switching state of the ventilation valve.

According to embodiments of the invention, a valve arrangement with such a control valve has at any rate basically proven successful for controlling a ventilation valve in a compressed-air supply installation. The compressed-air supply installation according to the invention has the advantage that, by means of the control valve, the control chamber of the ventilation valve can be aerated, and a control pressure can be enclosed in targeted fashion and can be ventilated.

It has proven to be advantageous if the control valve is designed as a 3/2 directional valve. The control valve ventilation connection is preferably connected via a control ventilation line to the one ventilation valve. The ventilation valve preferably has a ventilation inlet connection, to which the control ventilation line is connected. The control valve is preferably a solenoid valve.

The ventilation valve may have a ventilation inlet connection which differs from the pressure control connection and which is connected, independently of pressure, to the control valve ventilation connection.

It has proven to be advantageous if the control ventilation line has a throttle. The throttle is preferably positioned upstream of the ventilation inlet connection of the ventilation valve.

In a preferred embodiment, the ventilation inlet connection is designed as an additional valve seat. The ventilation valve may have a piston, which is preferably equipped with a closure body arranged thereon. By means of the closure body, the additional valve seat can be opened and closed.

It is furthermore advantageously possible for the ventilation valve to have a control chamber which is connected to the pressure control connection. The closure body is preferably arranged on a side of the piston which is averted from the control chamber.

In a first preferred embodiment, the ventilation valve is designed as a 3/2 directional relay valve. In this embodiment, the control valve ventilation connection, which is switchable by means of the ventilation valve, is switchably connectable to or separable from the ventilation connection of the compressed-air supply installation.

As an alternative to the embodiment of the ventilation valve as a 3/2 directional relay valve, the ventilation valve may be designed as a 6/2 directional relay valve. In this alternative embodiment, the control valve ventilation connection, which is switchable by means of the ventilation valve, is switchably connectable to the surroundings connection or separable from the surroundings connection.

The ventilation connection and the surroundings connection are preferably different ventilation connections to the surroundings.

It has proven to be advantageous if, when the ventilation valve is in an actuated state, the compressed-air connection is open to the ventilation connection. It is advantageous if, when the ventilation valve is in an actuated state, the control valve ventilation connection is closed with respect to the surroundings connection.

In a further preferred embodiment, the control valve ventilation connection differs from the control valve connection. The control ventilation line may differ from the ventilation line.

It has proven to be advantageous if the pneumatic control line, in particular between the control valve and the compressed-air connection, has no check valve.

In a further preferred embodiment, a residual maintaining pressure of the ventilation valve is predefinable by means of a ventilation valve spring, which is in particular variably settable, of the ventilation valve.

In a further embodiment of the compressed-air supply installation according to the invention, the control valve is designed as a 2/2 directional valve. It is preferable if the control valve ventilation connection assigned to the control valve is permanently connected to the pressure control connection of the ventilation valve. The control valve ventilation connection assigned to the control valve may be switchably connected, by means of the control valve connection of the control valve, to the compressed-air connection.

According to embodiments of the invention, a pneumatic system having an above-described compressed-air supply installation and a pneumatic installation is provided. The pneumatic installation is preferably a pneumatic installation in the form of an air suspension installation, which has a gallery and at least one bellows and/or accumulator branch line pneumatically connected to the gallery, wherein the connected bellows and/or accumulator branch line has a bellows and/or a pressure accumulator, wherein in each case one directional valve is positioned upstream of the bellows and/or of the pressure accumulator.

According to embodiments of the invention, a method for controlling an above-described compressed-air supply installation for the operation of a pneumatic installation, in particular of an air suspension installation of a vehicle, is provided, wherein the method, in a lift axle ventilation mode, has the following steps: briefly electrically energizing the control valve and thereby opening the ventilation valve connected in the ventilation line, whereby the control valve ventilation connection is closed with respect to the surroundings and thus a control pressure is enclosed in the control chamber and the control valve is held open; fully ventilating the pneumatic installation to atmospheric pressure, in particular all of the bellows, via the compressed-air connection and/or via a supply line which connects the compressed-air connection to the pneumatic installation, wherein the ventilation valve remains open and the compressed-air connection remains unpressurized; briefly electrically energizing the control valve again and thereby ventilating the control pressure enclosed in the control chamber into the unpressurized compressed-air connection, and closing the ventilation valve.

Alternatively or in addition, the method, in a residual pressure ventilation mode, has the following steps: activating the electrical energization of the control valve and thereby opening the ventilation valve connected in the ventilation line, wherein the control valve ventilation connection is closed with respect to the surroundings and the control chamber is preferably connected to the compressed-air connection, and thus a control pressure is fed into the control chamber and the control valve is held open, wherein the control chamber preferably remains connected to the compressed-air connection; ventilating the pneumatic installation, in particular all of the bellows, via the compressed-air connection, and preferably further via the pneumatic main line, the compressed-air feed, the ventilation line and/or the ventilation connection or the surroundings connection, wherein, during the course of the undershooting of a residual maintaining pressure in the compressed-air connection, the ventilation valve is closed and thus a desired residual pressure is held in the compressed-air connection; deactivating the electrical energization of the control valve.

By means of the operating modes of lift axle ventilation mode and residual pressure ventilation mode, it is possible for one and the same compressed-air supply installation according to the invention to be able to provide different ventilation modes through suitable electrical energization of the control valve. In the lift axle ventilation mode, only a twofold brief electrical energization of the control valve is necessary to completely ventilate the pneumatic installation via the compressed-air connection. By contrast, continuous electrical energization of the control valve in one and the same compressed-air supply installation effects a residual pressure ventilation mode, in which a desired residual pressure in the compressed-air connection is maintained.

FIG. 1 shows a preferred embodiment of a pneumatic system 100 having a compressed-air supply installation 10 and having a pneumatic installation 90. The compressed-air supply installation 10 has a compressed-air feed 1, a compressed-air connection 2 to the pneumatic installation 90, and a ventilation connection 3 to the surroundings. The compressed-air supply installation 10 furthermore comprises a pneumatic main line 60 between the compressed-air feed 1 and the compressed-air connection 2, and the pneumatic main line 60 has an air dryer 61 and a throttle 62. A ventilation line 70 of the compressed-air supply installation 10 runs between the compressed-air connection 2 and the ventilation connection 3. The pneumatic installation 90 is connected to the compressed-air connection 2 via a supply line 96.

The compressed-air supply installation 10 likewise has a valve arrangement 80 having a control valve 81, which is provided as a solenoid valve 81', for controlling a ventilation valve 71. In the exemplary embodiment illustrated here, the control valve is designed as a 3/2 directional valve.

The control valve is connected by means of a control valve connection X2, Y2 in a pneumatic control line 110, which is connected to a pressure control connection 71S of the ventilation valve 71. The ventilation valve 71 is connected by means of a ventilation valve connection X1, Y1 into the ventilation line 70.

According to the invention, the control valve 81 has a control valve ventilation connection Z2, which is switchably connectable to and separable from the ventilation connection 3 by means of the ventilation valve 71.

As can be seen from FIG. 1, a control ventilation line 73 is provided which is connected to a ventilation inlet connection of the ventilation valve. The ventilation inlet connection Z1 differs from the pressure control connection 71S.

As can be clearly seen on the right-hand side of FIG. 1, a pneumatic installation 90 in the form of an air suspension installation of a vehicle is provided. The pneumatic installation 90 has a gallery 95 from which, in each case in a manner pneumatically separable by means of a directional valve 93, there is connected a bellows branch line which leads to in each case one bellows 91. A pressure sensor 94 is connected to the gallery 95. The pneumatic installation 90 likewise has a pressure accumulator 92, which is connected via an accumulator branch line 92.

Figure 2:
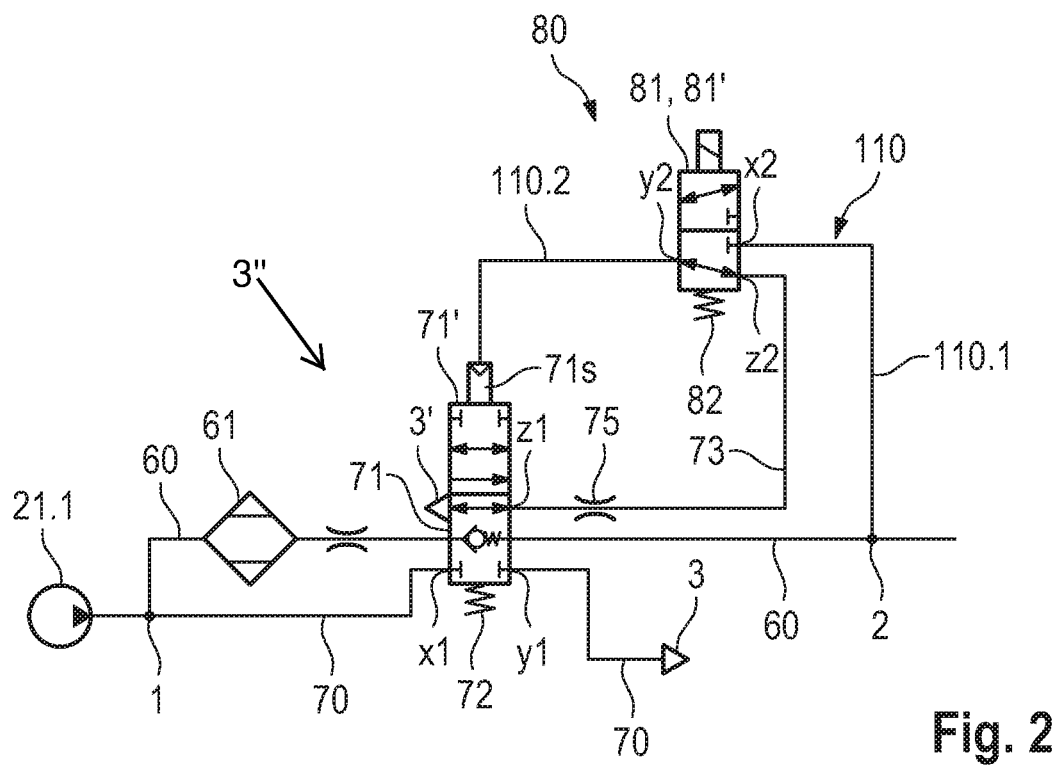
FIG. 2 shows an embodiment of a part of a compressed-air supply installation, wherein a valve arrangement having a control valve for controlling a ventilation valve is provided.

FIG. 2 shows a part of a preferred embodiment of a compressed-air supply installation 10, which may for example be connected to a pneumatic installation 90 (cf. FIG. 1). The embodiment shown in FIG. 2 symbolizes a so-called power release arrangement, in which the ventilation valve 71 is designed as a 6/2 directional relay valve.

The compressed-air supply installation 10 has a compressed-air feed 1, which is supplied with compressed air by means of a compressor 21.1. The compressed-air supply installation 10 likewise has a compressed-air connection 2 to the pneumatic installation (cf. FIG. 1), and a ventilation connection 3 to the surroundings. A pneumatic main line 60 between the compressed-air feed 1 and the compressed-air connection 2 has an air dryer 61.

The compressed-air supply installation 10 furthermore has a valve arrangement 80 having a control valve 81, designed as a 3/2 directional valve, for controlling the ventilation valve 71.

In FIG. 2, the control valve 81, which is provided as a solenoid valve 81', and the ventilation valve 71 are illustrated in the non-activated state.

As can likewise be seen from FIG. 2, the control valve 81 has a first control valve connection X2, which is connected via a first part 110.1 of a pneumatic control line 110 to the compressed-air connection 2. Likewise, the control valve 81 has a second control valve connection Y2, by means of which the control valve 81 is connected via a second part 110.2 of the pneumatic control line 110 to a pressure control connection 71S of the ventilation valve 71. According to the invention, the control valve 81 has a control ventilation valve connection Z2, which is switchably connectable to a surroundings connection 3', which is connected to the surroundings 3", and separable from the surroundings connection 3', by means of the ventilation valve 71. The surroundings connection 3' differs from the ventilation connection 3, though may also, in preferred embodiments, be identical.

With the arrangement shown in FIG. 2, it is possible for the pressure control connection 71S, which leads to a control chamber (cf. FIG. 4, control chamber 74), to be ventilated to the surroundings connection 3' via the second part 110.2 of the pneumatic control line and a control ventilation line, which connects the control ventilation valve connection to the ventilation inlet connection Z1 of the ventilation valve 71.

In the state shown in FIG. 2, the ventilation valve 71 is closed, that is to say the first ventilation valve connection X1 is pneumatically separated from the second ventilation valve connection Y1. Compressed air provided via the compressed-air feed 1 is conducted via the main line 60 through the air dryer in the direction of the compressed-air connection 2. The first part 110.1 of the pneumatic control line 110 is not connected to the second part 110.2 of the pneumatic control line 110.

As can likewise be seen from FIG. 2, the control ventilation line 73 has a throttle 75. It can likewise be seen in FIG. 2 that the ventilation inlet connection Z1, which differs from the pressure control connection 71S, is connected, independently of pressure, to the control ventilation valve connection Z2, specifically via the control ventilation line 73.

The actuation function of the compressed-air supply installation 10 shown in FIG. 2 will be described in more detail below. If a pressurized gallery (cf. for example gallery 95 in FIG. 1) is opened toward the compressed-air connection 2, then a pressure prevails at the first control valve connection X2, which pressure is however not passed through to the second control valve connection. By actuation of the control valve 81, the first control valve connection X2 is connected through to the second control valve connection Y2. Proceeding from the second control valve connection Y2, the compressed air passes via the second part 110.2 of the pneumatic control line 110 to the pressure control connection 71S of the ventilation valve. As soon as the compressed air introduced into the control chamber (cf. FIG. 4) via the pressure control connection 71S generates a pressure force which exceeds the counteracting spring force of a ventilation valve spring 72, the ventilation valve 71, 71' is switched into the actuated state.

When the ventilation valve 71, 71' is in an actuated state, the compressed-air connection 2 is opened to the ventilation connection 3. By contrast, the control ventilation valve connection Z2 is closed with respect to the surroundings connection 3'. If the electrical energization of the control valve 81 is then eliminated, then the control valve 81 passes into the position shown in FIG. 2, in which the second control valve connection Y2 is connected via the control ventilation line 73 and the throttle 75 to the ventilation inlet connection Z1 of the ventilation valve 71. The ventilation valve 71 however remains in the actuated state, because the control ventilation valve connection Z2 remains closed with respect to the surroundings connection 3' by means of the ventilation valve 71 itself. In other words, the opening pressure situated in the control chamber of the ventilation valve 71 remains in the control chamber, because the latter cannot be ventilated via the control ventilation line. A complete ventilation of the pneumatic installation, for example of all of the bellows 91 of the pneumatic installation 90 shown in FIG. 1, is thus possible via the compressed-air connection 2. After this ventilation process, the compressed-air connection 2 remains unpressurized.

A renewed brief electrical energization of the control valve 81 has the effect that the second control valve connection Y2 is pneumatically connected to the first control valve connection X2, and thus compressed air can escape from the control chamber of the ventilation valve 71 via the compressed-air control connection, the second part 110.2 and the first part 110.1 of the pneumatic control line 110 to the compressed-air connection 2, and be discharged via the ventilation connection 3, whereupon the ventilation valve 71, 71' closes again.

Figure 3:
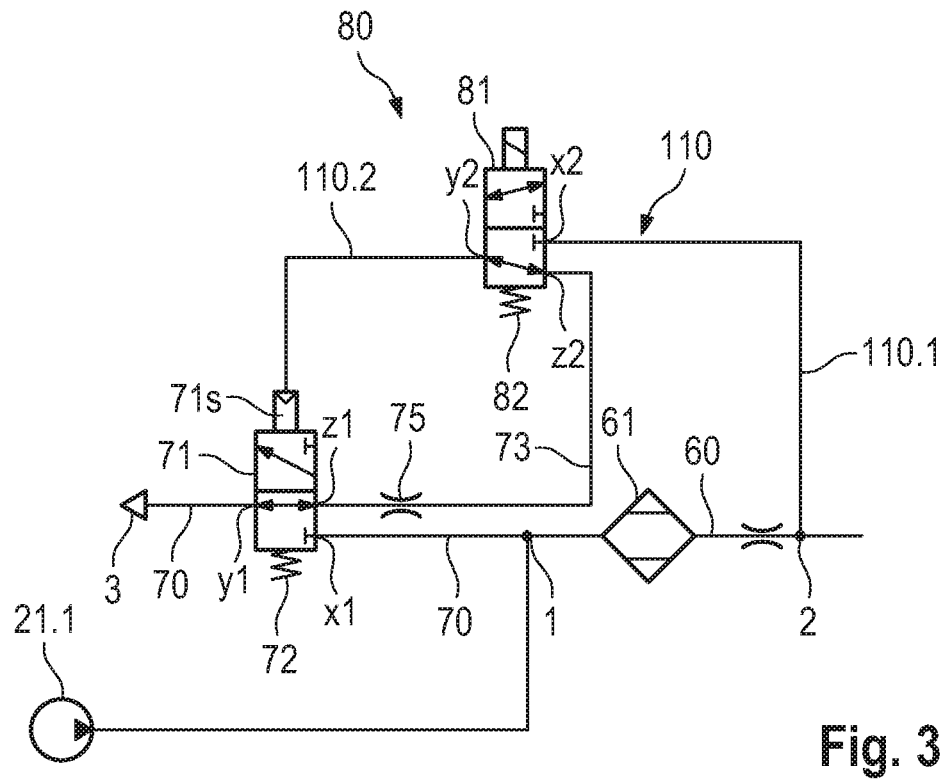
FIG. 3 shows an embodiment of a part of a compressed-air supply installation, wherein a valve arrangement having a control valve for controlling a ventilation valve is provided.

FIG. 3 shows an alternative exemplary embodiment of the compressed-air supply installation 10 according to the invention in relation to FIG. 2. In the so-called quick release arrangement illustrated in FIG. 3, the ventilation valve 71 is alternatively designed not as a 6/2 directional relay valve, as in FIG. 2, but as a 3/2 directional relay valve.

In the state shown in FIG. 3, the ventilation valve 71 is closed, that is to say the first ventilation valve connection X1 and the second ventilation valve connection Y1 are pneumatically separated from one another, such that no pressure can pass from the compressed-air connection via the air dryer and the ventilation line to the ventilation connection 3.

If the control valve 81, which is provided as a solenoid valve 81', is briefly electrically energized, then compressed air passes from the compressed-air connection 2 to the pressure control connection 71S of the ventilation valve 71 via the first and second control valve connections X2, Y2 of the solenoid valve 81, which are now connected to one another. When the control valve 81 is in an activated state, the second control valve connection Y2 is closed off with respect to the control ventilation valve connection Z2 of the control valve 81, such that no pressure can pass from the pressure control connection 71S to the ventilation connection 3. If the control pressure of the ventilation valve 71 is sufficiently high, said ventilation valve opens counter to the spring force of the ventilation valve spring 72, whereby the first ventilation valve connection X1 is connected to the second ventilation valve connection Y1, and thus compressed air can escape from the compressed-air connection 2 to the ventilation connection 3. At the same time, compressed air cannot pass via the pressure control connection 71S and the control ventilation line 73 to the ventilation connection, because this is separated from the ventilation connection 3 by the ventilation valve 71 itself. If a lift axle ventilation mode is desired, then the control valve 81 is electrically energized only briefly, that is to say only until the ventilation valve 71 opens. An electrical energization of the control valve 81 can thereafter be omitted, because ventilation of the control chamber via the pressure control connection 71S is prevented by the ventilation valve 71 itself. A pneumatic installation (cf. for example the pneumatic installation of FIG. 1) connected to the compressed-air connection 2 can be fully ventilated. By renewed brief electrical energization of the control valve, the control chamber is finally ventilated via the pressure control connection 71S and the first and second valve control valve connections X2 and Y2, which are then connected to one another, to the ventilation connection 3.

By contrast, if it is desired to maintain a residual pressure in the compressed-air connection 2 (residual pressure ventilation mode), then the control valve 81 is continuously electrically energized. In other words, the first and second control valve connections X2 and Y2 are connected to one another. Firstly, the relatively high pressure in the compressed-air connection 2 is then conducted via the ventilation valve 71 to the ventilation connection 3. As soon as the pressure in the compressed-air connection falls below a residual maintaining pressure threshold (pressure equalization via the opened control line 110), the ventilation valve 71 falls into its closed state. A desired residual pressure is defined by means of the ventilation valve spring 72, which is preferably designed to be adjustable.

Figure 3A:
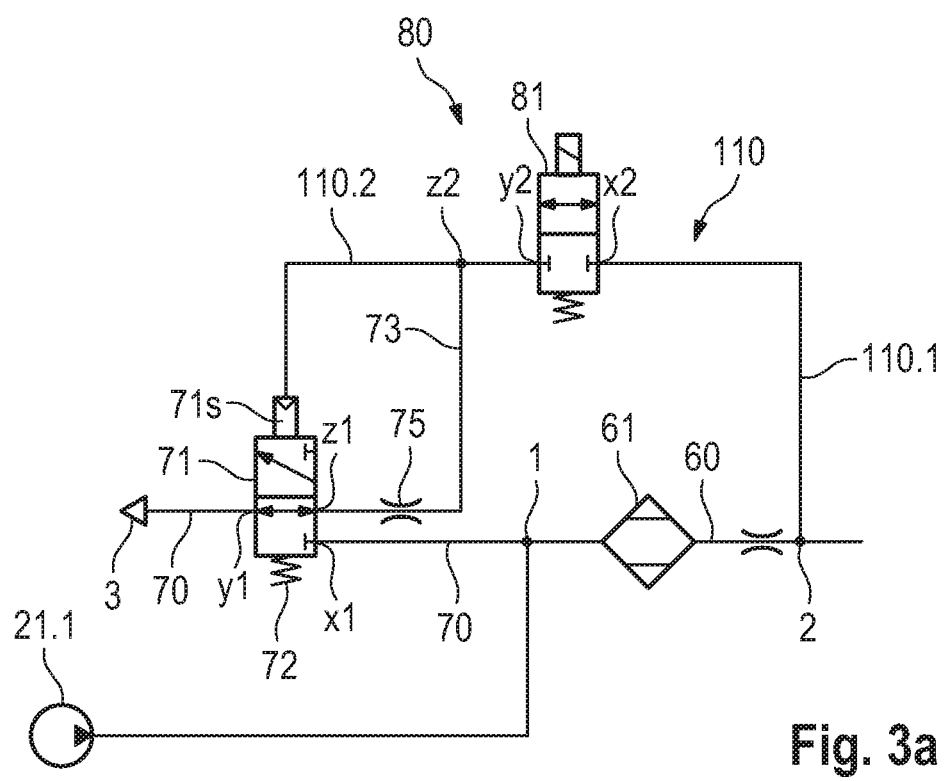
FIG. 3a shows a further embodiment of a part of a compressed-air supply installation, wherein a valve arrangement having a control valve for controlling a ventilation valve is provided.

FIG. 3a shows a further embodiment of a part of a compressed-air supply installation, wherein a valve arrangement 80 having a control valve 81, which is provided as a solenoid valve 81', for controlling a ventilation valve 71 is provided.

By contrast to the embodiments shown in FIGS. 2 and 3, it is the case in the embodiment of FIG. 3a that the control valve ventilation connection Z2 assigned to the control valve 81 is not part of the control valve 81. Rather, the control valve 81 is designed as a 2/2 directional valve, and the control valve ventilation connection Z2 assigned to the control valve 81 is permanently connected to the pressure control connection 71S of the ventilation valve 71, in the present embodiment via the second part 110.2 of the control line 110.

The control valve ventilation connection Z2 assigned to the control valve 81 is switchably connected, by means of the control valve 81, to the compressed-air connection 2. More specifically, the control valve ventilation connection Z2 is permanently connected to the second control valve connection Y2. By actuation of the control valve 81, the first control valve connection X2 is connected through to the second control valve connection Y2, and thus the control valve ventilation connection Z2 is connected to the compressed-air connection 2.

Figure 4:
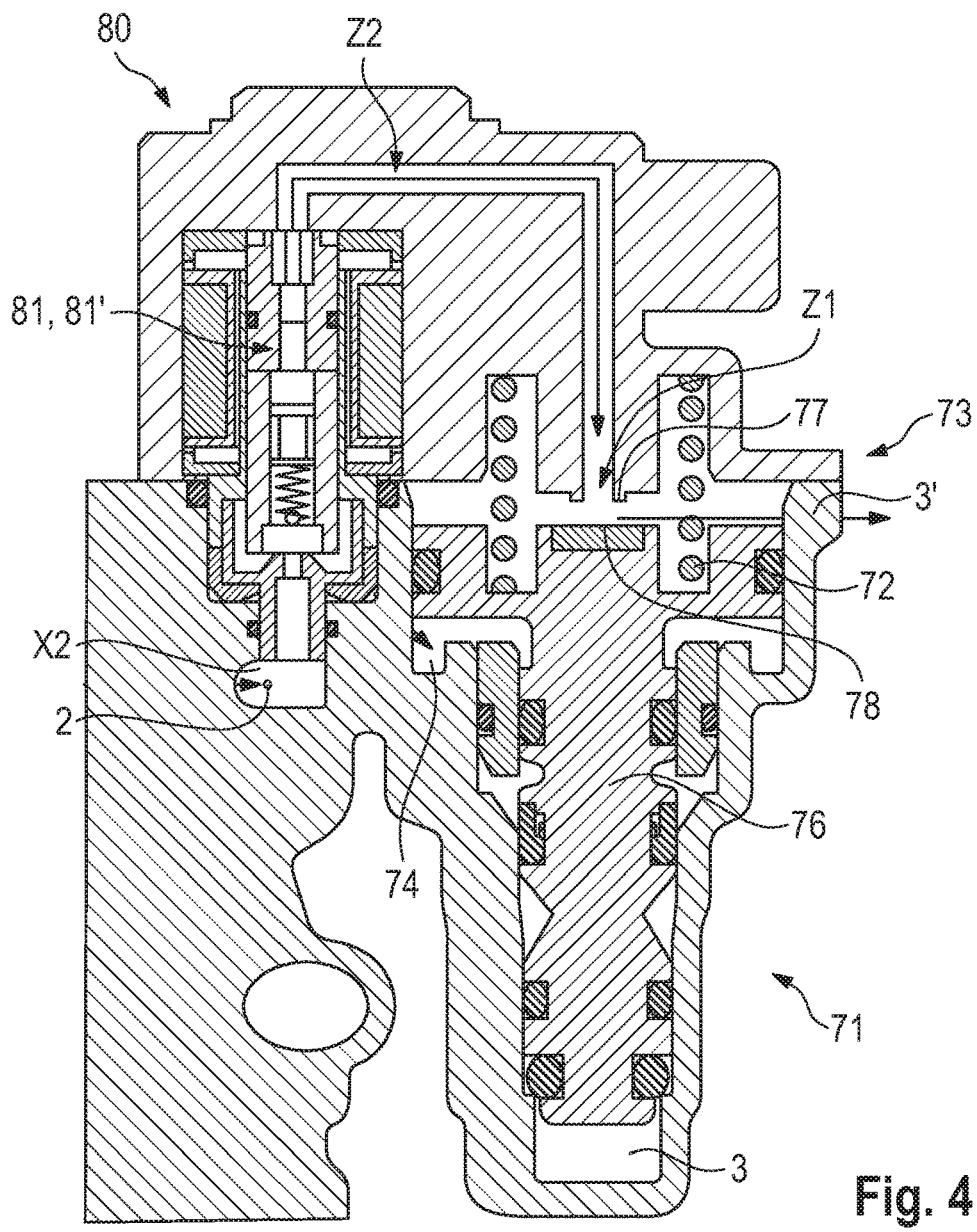
FIG. 4 shows a schematic sectional illustration through an embodiment of a valve arrangement.

FIG. 4 schematically shows a section through a preferred embodiment of a valve arrangement 80. The embodiment shown in FIG. 4 pneumatically corresponds to the circuit example of FIG. 2, that is to say in particular that the ventilation valve 71 is designed as a 6/2 directional relay valve. Owing to the sectional illustration shown, not all of the compressed-air lines are visible; the basic principle of the compressed-air supply installation 10 is however clearly illustrated.

As can be seen from FIG. 4, the ventilation valve 71 has a ventilation inlet connection Z1, which is connected, independently of pressure, to a control ventilation valve connection Z2 of the control valve 81 (solenoid valve). The ventilation inlet connection Z1 is, in the embodiment illustrated here, designed as an additional valve seat 77. The ventilation valve 71 has a piston 76 with a closure body 78 arranged thereon, by means of which closure body the additional valve seat 77 can be opened and closed.

The ventilation valve 71 has a control chamber 74, which is connected to the pressure control connection 71S (cf. FIG. 2). The closure body 78 is arranged on a side of the piston 76 which is averted from the control chamber 74.

A ventilation process will be described below. A pressure prevailing at the compressed-air connection 2 from the side of the pneumatic installation 90 (cf. FIG. 1) cannot escape to the ventilation connection 3, because the ventilation valve 71 (the position of the piston 76 shown in FIG. 4) is closed with respect to the ventilation connection 3. By actuation of the control valve 81, the first and second control valve connections X2, Y2 are connected to one another, such that compressed air can pass from the compressed-air connection 2 into the control chamber 74 of the ventilation valve 71. If the pressure force in the control chamber 74 overshoots the force of the oppositely acting ventilation valve spring 72, then the piston 76 is, in the embodiment shown in FIG. 4, moved upward, whereby the closure body 78 is pressed onto the additional valve seat 77. In this way, the ventilation inlet connection Z1 is closed off with respect to the surroundings connection 3', such that the control chamber 74 cannot be ventilated to the surroundings connection 3'; in other words, a control pressure is enclosed in the control chamber 74.

It is pointed out that the structural solution illustrated in FIG. 4 permits both a lift axle ventilation mode and a residual pressure ventilation mode. As already described with reference to FIGS. 2 and 3, for this purpose, it is merely necessary to select a respectively different activation pattern for the control valve 81.

Figure 5:
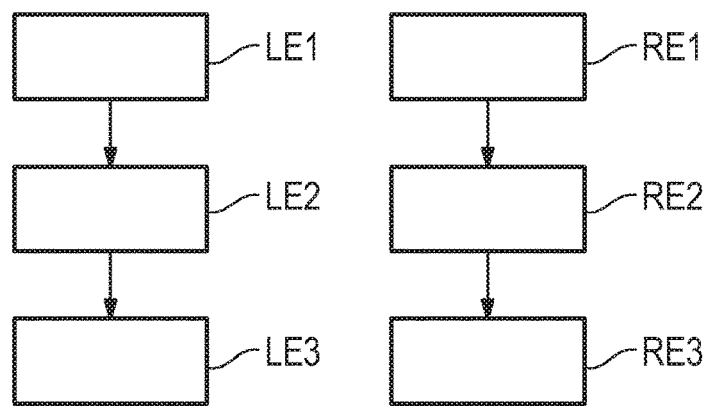
FIG. 5 shows a flow diagram for illustrating a control functionality.

Finally, FIG. 5 shows a flow diagram for illustrating preferred control functionalities. Both the lift axle ventilation mode subsumed in the method steps LE1 to LE3 and the (alternative) residual pressure ventilation mode subsumed in method steps RE1 to RE3 can be realized by means of one and the same compressed-air supply installation according to the invention, in particular by means of the preferred exemplary embodiment of FIG. 4. In a first method step LE1 of the lift axle ventilation mode, brief electrical energization of the control valve 81 and thus opening of the ventilation valve 71 connected in the ventilation line 70 are performed. The control ventilation valve connection Z2 is thus closed with respect to the surroundings 3', and a control pressure is thus enclosed in the control chamber 74. The control valve 81 is held open. A brief electrical energization is to be understood in particular to mean a period of time required to open the ventilation valve 71. This period of time of a brief electrical energization is self-evidently dependent on the pressure conditions, and/or on the dimensioning of the control chamber and of the ventilation valve spring.

In a subsequent second step LE2, full ventilation of the pneumatic installation, in particular of all of the bellows 91 of the pneumatic installation shown in FIG. 1, is performed via the compressed-air connection 2 to the ventilation connection 3. The ventilation valve 71 remains open; the full ventilation ends when the compressed-air connection 2 remains unpressurized.

In a subsequent third step LE3, a renewed brief electrical energization of the control valve 81 is performed. In this way, the control chamber 74, more specifically the control pressure enclosed in the control chamber 74, is ventilated into the unpressurized compressed-air connection 2. As a result, the ventilation valve 71 closes owing to the spring force of the ventilation valve spring 72.

The method steps RE1 to RE3 shown on the right-hand side of FIG. 5 denote a residual pressure ventilation mode, which is performed additionally, though preferably alternatively, to the lift axle ventilation mode.

In a first step RE1, an electrical energization of the control valve 81 is activated, and thus an opening of the ventilation valve 71 connected in the ventilation line 70 is realized. The control ventilation valve connection Z2 is separated from Y2 and is closed with respect to the surroundings 3', and thus a control pressure is enclosed in the control chamber 74. The control valve 81 is held open.

The sub-step of the separation of the control ventilation valve connection Z2 from the control valve connection may be omitted if, as can be seen from FIG. 3a, the control valve 81 is designed as a 2/2 directional valve and the control valve ventilation connection Z2 assigned to the control valve 81 is permanently connected to the pressure control connection 71S of the ventilation valve 71.

In a second step RE2, ventilation of the pneumatic installation, in particular of all of the bellows 91 of the pneumatic installation shown in FIG. 1 and of the control chamber, is performed via the compressed-air connection 2. During the course of the undershooting of a residual maintaining pressure in the compressed-air connection 2, the ventilation valve 71 is closed owing to the ventilation valve spring 72, and a desired residual pressure in the compressed-air connection 2 is thus maintained.

In a subsequent third step RE3, the control valve 81 is finally switched into an electrically deenergized state. As a result, the control chamber 74 or the pressure control connection 71S is "emptied of remnants" via the control valve connection Y2 and the control valve ventilation connection Z2, which are now in a connected state, onward via the control ventilation line 73 and the throttle 75, and finally via the ventilation inlet connection Z1 and the ventilation valve connection Y1, which are now in a connected state, such that it is ensured that the control chamber 74 is unpressurized.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Compressed-air feed
2 Compressed-air connection
3 Ventilation connection
3' Surroundings connection
3" Surroundings
10 Compressed-air supply installation
60 Main line
61 Air dryer
70 Ventilation line
71 Ventilation valve
71S Pressure control connection
72 Ventilation valve spring
73 Control ventilation line
74 Control chamber
75 Throttle
76 Piston
77 Additional valve seat
78 Closure body
80 Valve arrangement
81 Control valve
81' Solenoid valve
90 Pneumatic installation
91 Bellows
91L, 92L Bellows and/or accumulator branch line
92 Pressure accumulator
93 Directional valve
95 Gallery
96 Supply line
100 Pneumatic system
110 Control line
110.1 First part of the control line
110.2 Second part of the control line
X1, Y1 Ventilation valve connection
X2, Y2 Control valve connection
Z1 Ventilation inlet connection
Z2 Control valve ventilation connection
LE1,2,3 Method steps of the lift axle ventilation mode
RE1,2,3 Method steps of the residual maintaining pressure ventilation mode

The invention claimed is:

1. A compressed-air supply installation for operating a pneumatic installation, the compressed-air supply installation comprising:
 a compressed-air feed;
 a compressed-air connection to the pneumatic installation;
 a ventilation connection to a surrounding environment;
 a pneumatic main line between the compressed-air feed and the compressed-air connection, the pneumatic main line having an air dryer;
 a ventilation line between the compressed-air feed and the ventilation connection; and
 a valve arrangement having a control valve configured to control a ventilation valve,
 wherein the control valve is connected by a control valve connection in a pneumatic control line that is connected to a pressure control connection of the ventilation valve,
 wherein the ventilation valve is connected by a ventilation valve connection in the ventilation line,
 wherein the control valve is assigned a control valve ventilation connection that is configured to be switchably connected, by the ventilation valve, to the ventilation connection or to a connection to the surrounding environment and which is configured to be switchably separated, by the ventilation valve, from the ventilation connection or from a surroundings connection.

2. The compressed-air supply installation as claimed in claim 1, wherein the control valve is a solenoid valve.

3. The compressed-air supply installation as claimed in claim 1, wherein the control valve is designed as a 3/2 directional valve.

4. The compressed-air supply installation as claimed in claim 1, wherein the ventilation valve has a ventilation inlet connection which differs from the pressure control connection and which is connected, independently of pressure, to the control valve ventilation connection.

5. The compressed-air supply installation as claimed in claim 1, wherein the control valve ventilation connection is connected via a control ventilation line to the ventilation valve.

6. The compressed-air supply installation as claimed in claim 5, wherein the control ventilation line has a throttle.

7. The compressed-air supply installation as claimed in claim 4, wherein the ventilation inlet connection is designed as an additional valve seat, and the ventilation valve has a piston with a closure body arranged thereon, piston with the closure body being configured to open and close the additional valve seat.

8. The compressed-air supply installation as claimed in claim 7, wherein the ventilation valve has a control chamber connected to the pressure control connection, wherein the closure body is arranged on a side of the piston which is averted from the control chamber.

9. The compressed-air supply installation as claimed in claim 1, wherein the ventilation valve is designed as a 3/2 directional valve.

10. The compressed-air supply installation as claimed in claim 1, wherein the ventilation valve is designed as a 6/2 directional valve.

11. The compressed-air supply installation as claimed in claim 10, wherein, when the ventilation valve is in an actuated state, the compressed-air connection is open to the ventilation connection and the control valve ventilation connection is closed with respect to the surroundings connection.

12. The compressed-air supply installation as claimed in claim 5, wherein the control valve ventilation connection differs from the control valve connection and/or the control ventilation line differs from the ventilation line.

13. The compressed-air supply installation as claimed in claim 1, wherein the pneumatic control line has no check valve between the control valve and the compressed-air connection.

14. The compressed-air supply installation as claimed in claim 1, wherein a residual maintaining pressure is predefinable by a ventilation valve spring of the ventilation valve.

15. The compressed-air supply installation as claimed in claim 1, wherein the control valve has the control valve ventilation connection.

16. The compressed-air supply installation as claimed in claim 1, wherein the control valve is designed as a 2/2 directional valve, wherein the control valve ventilation connection assigned to the control valve is permanently connected to the pressure control connection of the ventilation valve, and wherein the control valve ventilation connection assigned to the control valve is switchably connected, by the control valve connection of the control valve, to the compressed-air connection.

17. A pneumatic system, comprising:
the compressed-air supply installation as claimed in claim 1; and
the pneumatic installation, wherein the pneumatic installation is formed in the manner of an air suspension installation having a gallery and at least one bellows and/or accumulator branch line pneumatically connected to the gallery,
wherein the connected bellows and/or accumulator branch line has a bellows and/or a pressure accumulator, and
wherein in each case one directional valve is positioned upstream of the bellows and/or of the pressure accumulator.

18. A method for controlling the compressed-air supply installation of claim 1, for operating the pneumatic installation, the method comprising:
in a ventilation mode:
briefly electrically energizing the control valve and thereby briefly opening the ventilation valve connected in the ventilation line, whereby the control valve ventilation connection is closed with respect to the surrounding environment and thus a control pressure is enclosed in a control chamber and the ventilation valve is held open;
fully ventilating the pneumatic installation to atmospheric pressure via the compressed-air connection and/or via a supply line which connects the compressed-air connection to the pneumatic installation, wherein the ventilation valve remains open and the compressed-air connection remains unpressurized; and
briefly electrically energizing the control valve again and thereby ventilating the control pressure enclosed in the control chamber into the unpressurized compressed-air connection, and closing the ventilation valve; and/or
in a residual maintaining pressure ventilation mode:
activating the electrical energization of the control valve and thereby opening the ventilation valve connected in the ventilation line, whereby the control valve ventilation connection is closed with respect to the surrounding environment and thus a control pressure is fed into the control chamber and the ventilation valve is held open;
ventilating the pneumatic installation via the compressed-air connection, wherein, during the course of the undershooting of a residual maintaining pressure in the compressed-air connection, the ventilation valve is closed and thus a desired residual maintaining pressure is held in the compressed-air connection; and
deactivating the electrical energization of the control valve.

19. The method as claimed in claim 18, wherein the control valve ventilation connection is closed by switching of the ventilation valve to the surrounding environment.

* * * * *